(12) United States Patent
Newell et al.

(10) Patent No.: US 10,791,147 B2
(45) Date of Patent: *Sep. 29, 2020

(54) DEVICE AUTHENTICATION BASED UPON TUNNEL CLIENT NETWORK REQUESTS

(71) Applicant: AirWatch LLC, Atlanta, GA (US)

(72) Inventors: Craig Farley Newell, Atlanta, GA (US); Jonathan Blake Brannon, Smyrna, GA (US); Kabir Barday, Atlanta, GA (US); Ashish Jain, Los Altos, CA (US)

(73) Assignee: AirWatch LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,533

(22) Filed: Nov. 2, 2018

(65) Prior Publication Data

US 2019/0075136 A1 Mar. 7, 2019

Related U.S. Application Data

(63) Continuation of application No. 15/168,398, filed on May 31, 2016, now Pat. No. 10,122,761.

(51) Int. Cl.
*H04L 29/00* (2006.01)
*H04L 29/06* (2006.01)

(52) U.S. Cl.
CPC .......... *H04L 63/20* (2013.01); *H04L 63/0272* (2013.01); *H04L 63/0281* (2013.01); *H04L 63/0815* (2013.01); *H04L 63/166* (2013.01)

(58) Field of Classification Search
CPC ... H04L 63/20; H04L 63/166; H04L 63/0272; H04L 63/029; H04L 63/0815
See application file for complete search history.

(56) References Cited

U.S. PATENT DOCUMENTS

| 9,646,309 | B2 * | 5/2017 | Goldschlag | H04L 63/20 |
| 9,866,591 | B1 * | 1/2018 | Statica | H04L 63/20 |
| 2004/0167984 | A1 | 8/2004 | Herrmann | |
| 2006/0041761 | A1 | 2/2006 | Neumann et al. | |
| 2011/0321152 | A1 | 12/2011 | Tor et al. | |
| 2015/0052595 | A1 | 2/2015 | Murphy | |
| 2015/0096010 | A1 | 4/2015 | Pollutro et al. | |
| 2015/0271013 | A1 | 9/2015 | Singh et al. | |
| 2015/0295892 | A1 | 10/2015 | Fox | |
| 2016/0052595 | A1 | 2/2016 | Dommsch | |

(Continued)

FOREIGN PATENT DOCUMENTS

WO 2015154066 10/2015

OTHER PUBLICATIONS

Office Action dated for U.S. Appl. No. 15/168,394.

*Primary Examiner* — Jeffrey C Pwu
*Assistant Examiner* — Helai Salehi
(74) *Attorney, Agent, or Firm* — Thomas | Horstemeyer, LLP

(57) ABSTRACT

Disclosed are various approaches for providing authentication of a user and a client device. A user's credentials can be authenticated by an identity provider. In addition, a device posture assessment that analyzes the device from which the authentication request originates is also performed. An authentication request can be authenticated based upon whether the device posture assessment reveals that device to be a managed device that is in compliance with compliance rules.

20 Claims, 5 Drawing Sheets

(56) References Cited

U.S. PATENT DOCUMENTS

| | | |
|---|---|---|
| 2016/0191567 A1 | 6/2016 | Chahal et al. |
| 2016/0285858 A1 | 9/2016 | Li et al. |
| 2016/0292694 A1* | 10/2016 | Goldschlag ............ H04L 63/20 |
| 2016/0366121 A1 | 12/2016 | Rykowski et al. |
| 2017/0223012 A1 | 8/2017 | Xu et al. |

* cited by examiner

DEVICE AUTHENTICATION BASED UPON TUNNEL CLIENT NETWORK REQUESTS

CROSS-REFERENCE TO RELATED APPLICATIONS

This application is a continuation of and claims the benefit of U.S. patent application Ser. No. 15/168,398, entitled "DEVICE AUTHENTICATION BASED UPON TUNNEL CLIENT NETWORK REQUESTS," and filed May 31, 2016, the disclosure of which is expressly incorporated herein by reference in its entirety. This application is related to U.S. application Ser. No. 15/168,394 entitled DEVICE AUTHENTICATION BASED UPON TUNNEL CLIENT NETWORK REQUESTS and U.S. application Ser. No. 15/168,404 entitled DEVICE AUTHENTICATION BASED UPON TUNNEL CLIENT NETWORK REQUESTS, both of which were filed on May 31, 2016.

BACKGROUND

Enterprises often deploy applications to user client devices such as smartphones. Client devices can be managed by a management service that provides the ability to remotely manage or administer client devices that are enrolled with the management service as a managed device. For example, devices that are running a variant of the Android™ operating system can be enrolled with a remotely executed management service using application programming interfaces (APIs) or other capabilities that are embedded within the operating system of the device. A management component can also be installed on a client device so the device can be locally managed by the management component and remotely managed by the management service. An administrator can define policies or profiles that are associated with a particular client device through the management service, which can transmit the policies or profiles to the client device. The management component on the client device can install or enforce the policies or profiles on the client device. Additionally, the management service can issue commands to the management component to take certain actions on the client device.

An administrator can also deploy applications to a client device enrolled as a managed device through the management service. In one example, the management service can instruct the management component to install a particular application that an enterprise might wish to deploy. Applications can include third party applications such as productivity applications, messaging applications or other applications that might require authentication with one or more servers or services associated with the application. For example, a productivity application might require a subscription that requires a login or authentication process to be performed. The authentication process might be federated by the application service provider to the directory service or identity management service of the enterprise.

Accordingly, to complete the authentication process, an applications service can receive an authentication request from an application executed on the client device and redirect the request to an identity management service of the enterprise. The identity management service of the enterprise can authenticate the user and provide an authentication assertion or token to the application, which can be presented to the application service to authenticate a user's identity. Providing single sign-on capabilities allows the user to log on without having to provide his or her credentials to authenticate his or her access to the application.

However, a single sign-on process through an identity provider does not allow a way to check whether the device is in compliance with enterprise rules. That is, although single sign-in authenticates a user, the device itself may still be compromised. As a result, there remains a problem with a posture assessment of the device on which the application is running at the time of user authentication to ensure that the device is enrolled as a managed device and in compliance with one or more device compliance policies of the enterprise.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of a system that facilitates authentication of a user and of a client device that is managed by a management service. Application developers often support various standards for exchanging authentication data between entities, such as a service or server associated with the application, the device from which a service is accessed, and an identity provider that can authenticate a user. One example includes Security Assertion Markup Language (SAML), which is a specification that can support single sign-on of a user to a service, where access to the service is determined based on a user's identity within an identity provider.

Examples of this disclosure can facilitate single sign-on of a user by leveraging specifications and protocols like SAML that submit an authentication request to an identity provider. In addition, examples of the disclosure can also identify the device and the particular application from which the authentication request originates. By identifying the device and the application, compliance of the device with device compliance policies enforced by a management service on the managed device can also be assessed. Additionally, for example, authentication of a user can be limited to certain devices and even certain networks, locations, or other parameters by identifying the device and various device identification parameters associated with the device. In this way, a more granular authentication framework can be provided to enterprises.

Authentication of a user, device, and application is implemented by redirecting authentication requests and potentially other traffic from the application through a tunnel client on the client device on which the application is installed. Various operating systems, such as iOS®, Android®, and Windows® allow installation of a virtual private network (VPN) configuration or profile that configures a tunnel client on the client device. In some cases, these operating systems allow installation of a VPN configuration on a per-application basis so that certain or all traffic for a particular application is routed through a VPN connection initiated by the tunnel client. The VPN configuration can specify that network traffic routed through the VPN connection should be secured with a security layer that includes device identification parameters and is secured using a certificate installed on the client device by a management service. In this way, the device identification parameters as well as a certificate signature or fingerprint can be verified by an identity provider or a management service in communication with an identity provider.

Figure 1:
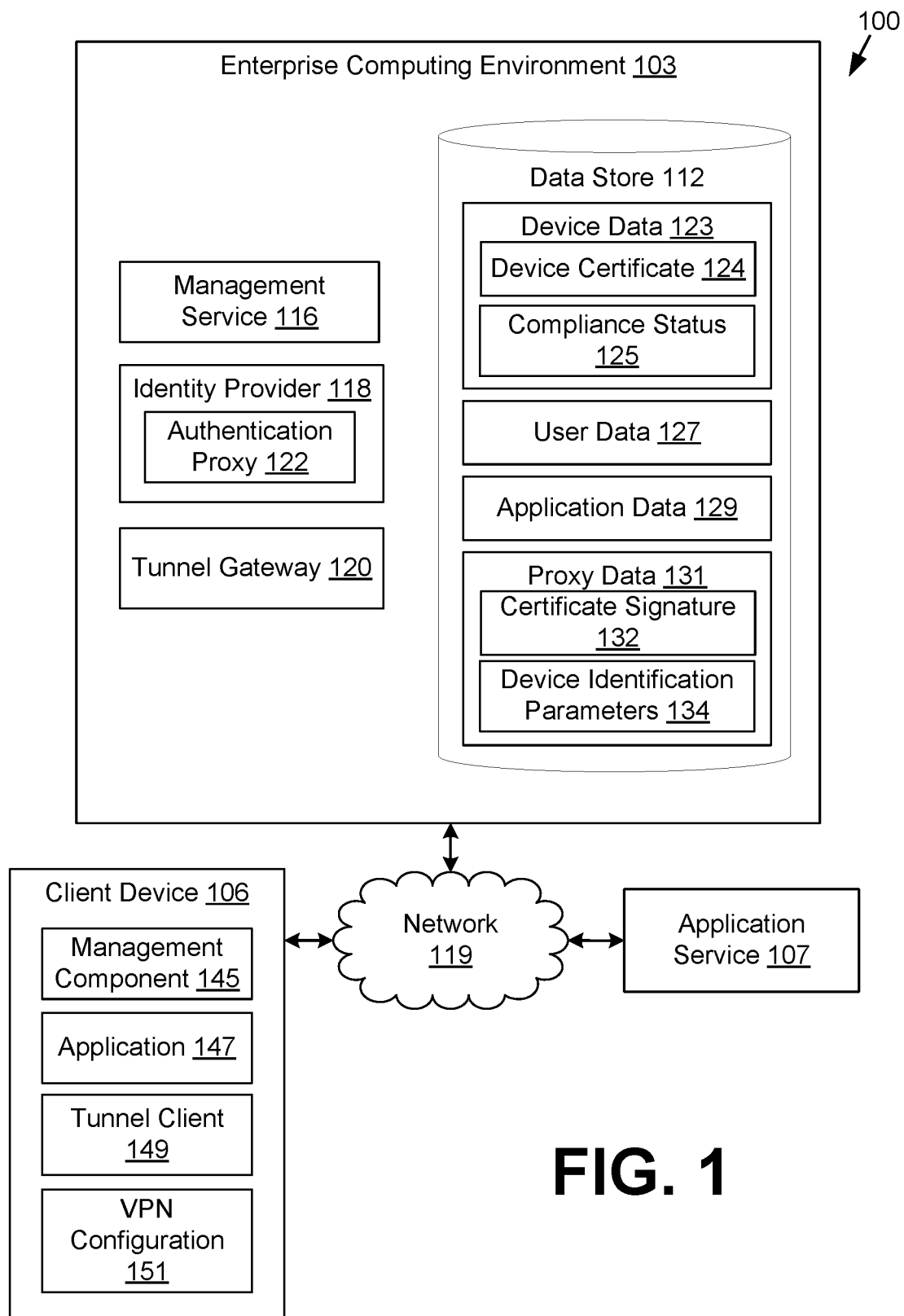
FIG. 1 is a schematic block diagram depicting an example implementation according to various examples of the disclosure.

FIG. 1 illustrates an example of a networked environment 100 according to examples of the disclosure. In the depicted network environment 100, an enterprise computing environment 103 is in communication with at least one client device 106 and an application service 107 over a network 119.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or other organization. The enterprise computing environment 103 includes a computing device, such as a server computer, that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 includes multiple computing devices that together can form a hosted computing resource or a grid computing resource. Additionally, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein.

Various applications or other functionality can be executed in the enterprise computing environment 103. Also, various data can be stored in a data store 112 that can be accessible to the enterprise computing environment 103. The data store 112 can be representative of a plurality of data stores 112. The data stored in the data store 112 can be associated with the operation of the various applications or functional entities described below.

The components executed on the enterprise computing environment 103 can include a management service 116, an identity provider 118, a tunnel gateway 120, and other applications, services, processes, systems, engines, or functionality not discussed in detail herein. The management service 116 can be executed in the enterprise computing environment 103 to monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116.

The management service 116 can include a management console that can allow administrators to manage client devices 106 that are enrolled with the management service 116. User interfaces can allow an administrator to define policies for a user account or devices associated with an enterprise environment. The user interfaces can also include, for example, presentations of statistics or other information regarding the client devices 106 that can be managed by the management service 116.

The enterprise computing environment 103 can also execute an identity provider 118. The identity provider 118 can carry out federated user authentication on behalf of an enterprise. For example, the identity provider 118 can implement OAuth, SAML, or similar protocols that allow for federated user authorization or authentication. In examples of this disclosure, the identity provider 118 can also perform additional authentication of a user in response to an authentication request based upon a posture assessment of the device originating the authentication request.

The enterprise computing environment 103 can also execute an authentication proxy 122. In some examples, the authentication proxy 122 can be implemented as functionality of the identify provider service 118 or as a separate module or service in communication with the identity provider 118. The authentication proxy 122 can receive authentication requests that are tunneled through a VPN connection from a client device 106. In some examples, the client device 106 can terminate the VPN connection at a network address of the authentication proxy 122. The authentication proxy 122 can then remove a security layer applied to the authentication request, such as an encryption layer, and provide the authentication request to the identity provider 118.

In some examples, the security layer can include a transport layer security (TLS) encryption layer applied to the authentication request, which can be layered atop another TLS encryption layer applied to the authentication request by the application 147. In this example, the application 147 can apply its own encryption layer to the authentication request, where the request is terminated at the identity provider 118, and the VPN connection can result in another encryption layer applied to the authentication request that is terminated at the authentication proxy 122.

When the authentication proxy 122 receives an authentication request from a client device 106, it can remove the security layer, such as an encryption layer, from the authentication request. The authentication proxy 122 can retain or store a signature of a certificate used to secure or encrypt the security layer applied to the authentication request in the data store 112. The authentication proxy 122 can also extract device identification parameters that are embedded within the security layer as specified by the VPN connection from the client device 106. Device identification parameters can include a network address, a device identifier, an application identifier of an application 147 from which an authentication request is received, geolocation parameters embedded within the security layer, or other parameters by which the client device 106 can be identified.

When an authentication request is provided to the identity provider 118, the identity provider 118 can query the authentication proxy 122 for a certificate signature corresponding to a certificate with which the security layer was applied. The identity provider 118 can also query the authentication proxy 122 for device identification parameters that were stored by the authentication proxy 122 in the data store 112. The identity provider 118 can then query the management service 116 with the device identification parameters and certificate signature, which can provide an indication of whether the client device 106 associated with the parameters is a managed device that is in compliance with compliance rules of the enterprise.

The enterprise computing environment 103 can also execute a tunnel gateway 120, which can communicate with a tunnel client 149. In some examples of a tunnel client 149, all network traffic is routed through a server process and determines a termination point on the network 119 for the network traffic. In other examples of a tunnel client 149, the tunnel client 149 employs split routing, where traffic that is destined for a network address on an external network is sent to the termination point on the network 119 and traffic destined for an internal network on a private network is sent to the tunnel gateway 120, which routes traffic to an internal network destination.

The data stored in the data store 112 can include device data 123, user data 127, application data 129, proxy data 131, and potentially other data. Device data 123 can include records to client devices 106 that are enrolled as managed devices with the management service 116. A record within device data 123 can include various security settings selected for enforcement on a client device 106 that is enrolled with the management service 116. Accordingly, a device record can include a device identifier associated with a device, such as the client device 106, one or more device certificates 124, and a compliance status 125. In some examples, device data 123 can also identify a user associated with a particular client device 106. A device record can also store other device specific information, such as a device type, operating system type or version, applications that are required or optional for the device, or an enrollment status of the device. In this scenario, the device data 123 can also indicate whether a managed device is a computing device or a peripheral device, such as a printer, scanner, or other device that can be deployed in an environment and associated with a record in a directory service.

A device certificate 124 can include a certificate that is generated on behalf of a client device 106 that is enrolled with the management service 116 as a managed device. A device certificate 124 can include a key pair, such as a public and private key that is employed in a public key encryption methodology. A device certificate 124 can also include an X.509 digital certificate that can be used to encrypt communications between the client device 106 and other systems accessible via the network 119. In one example of the disclosure, the management service 116 can generate or obtain a device certificate 124 for a client device 106. In another example of the disclosure, the management service 116 can generate or obtain a device certificate 124 for each application that is installed on the client device 106 by the management service 116.

A compliance status 125 of a client device 106 represents whether the device is in compliance with one or more compliance rules. Various compliance rules can be enforced by the management service 116 by the client device 106. Compliance rules can be based on time, geographical location, or device and network properties. For instance, the client device 106 can satisfy a compliance rule when the client device 106 is located within a particular geographic location. The client device 106 can satisfy a compliance rule in other examples when the client device 106 is in communication with a particular local area network, such as a particular local area network that is managed by the enterprise computing environment 103. Furthermore, a compliance rule in another example can be based upon the time and date matching specified values.

A compliance rule can specify that a client device 106 is required to be off or in a low power "sleep" state during a specified time period. Another compliance rule can specify that a client device 106 is required to be on or in a normal operation "awake" state during a specified time period. As another example, a compliance rule can specify that a client device 106 is prohibited from rendering content that has been designated as confidential.

Another example of a compliance rule involves whether a user belongs to a particular user group. For instance, a compliance rule can include a whitelist or a blacklist that specifies whether particular users or groups of users are authorized to perform various functionalities, such as installing or executing a particular application.

Other examples of compliance rules include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule can specify that the client device 106 is required to prompt a user for a password or personal identification number (PIN) in order to unlock the device.

A compliance rule can also require that the client device 106 have device encryption enabled, where data stored on the device is stored in an encrypted form. The data can be encrypted by a device certificate 124. A compliance rule can also specify that the client device 106 is enrolled with the management service 116 as a managed device. Another compliance rule can specify that the user is required to accept the terms of service that are presented by the management component 145 on the client device 106. As another example, a compliance rule can specify that the management component 145 is required to periodically communicate or "check-in" with the management service 116 to report on its status. If a threshold amount of time has elapsed since the previous check-in of the client device 106, the device can be considered to have violated this compliance rule.

Another compliance rule can specify that a client device 106 be running one of a specified variants or versions of a particular operating system. A compliance rule can also specify that an enrolled device be manufactured by a particular manufacturer or have a particular manufacturer identifier. Another compliance rule can specify that an enrolled device be a particular model name or model number. A client device 106 can also be considered out of compliance if the device is in a data roaming mode or has used a threshold amount of a periodic network data usage allowance.

Accordingly, the compliance status 125 indicates whether and to what extent a particular client device 106 is compliant with compliance rules assigned to the client device 106 by the management service 116. The compliance status 125 can be determined by a management component 145 on the client device 106 that analyzes the status of the client device 106 and reports compliance to the management service 116. In other examples, the compliance status 125 can be determined by the management service 116 based upon information about the status of the client device 106 that is reported by the management component 145. In examples of the disclosures, the compliance status 125 can also be determined by the identity provider 118 or management service 116 based upon an analysis of device identification parameters that are embedded within an authentication request originating from an application 147 or application service 107 associated with the application 147.

User data 263 contains information about users who are associated with client devices 106 that are enrolled with the management service 116. User data 263 can include profile information about a user, authentication information about a user, applications that are installed on client devices 106 associated with the user, and other user information. For example, user data 263 can include information about client devices 106 that are associated with a user account of the user, enterprise resources to which a particular user has access, such as email, calendar data, documents, media, applications, network sites, or other resources. The user data 263 can also identify one or more user groups of which a particular user is a member, which can in turn define the access rights of the user to one or more enterprise resources as well as identify which applications should be deployed to a client device 106 associated with the user. To this end, the user data 263 can further identify one or more device identifiers that can uniquely identify client devices 106 that are associated with a user account of the user.

Application data 129 represents data about applications that can be deployed through the management service 116 to client devices 106 that are enrolled as managed devices. Application data 129 can include application binaries or packages, a reference to a publicly accessible repository from which an application 147 can be obtained, and licensing or authentication data for an application 129. Application data 129 can also store configuration data for each client device 106 on which a copy of an application 147 is installed. The configuration data can include an application identifier corresponding to a unique installation of an application 147 on a particular client device 106 of a user. The configuration data can also include data about a VPN configuration 151 on the client device 106 through which application traffic such as authentication requests can be routed so that authentication requests that include a particular application identifier can be associated with a particular client device 106.

Proxy data 131 represents data stored by the authentication proxy 122 that is extracted from a security layer applied to authentication requests from applications 147. The security layer can be applied by the tunnel client 149 on the client device 106. The certificate signature 132 represents a signature or fingerprint of a certificate that is used to secure the connection between the tunnel client 149 and the authentication proxy. Because the certificate can be installed on the client device 106 by the management service 116, an identification of the client device 106 can be performed because the certificate signature 132 can uniquely identify a public or private key corresponding to the certificate used to encrypt or otherwise secure the authentication request that is sent to the authentication proxy 122. The certificate signature 132 can be a unique cryptographic signature that is generated from a public key or public certificate data that is used to apply a security layer to authentication requests sent to the authentication proxy 122.

Device identification parameters 134 represent other device identifying information that is included within the security layer by the tunnel client 149. As noted above, the device identification parameters can include an application identifier that identifies the application 147 from which an authentication request originates. A device identification parameter can also include geolocation parameters identifying a location of the client device 106, a network address of the client device 106, or other device identifying parameters that the tunnel client 149 can embed within a security layer applied to the authentication request from the application 147.

The client device 106 can represent multiple client devices 106 coupled to the network 119. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 116 as a managed device of the enterprise.

The client device 106 can execute a management component 145 that can communicate with the management service 116 to facilitate management of the client device 106. The management component 145 can communicate with the management service 116 to enforce management policies and compliance rules on the client device 106. For example, the management component 145 can enforce data security requirements, install, remove or update security certificates, or write, modify or delete certain data from the client device 106. The management component 145 can also monitor network activity of the client device 106, the location of the client device 106, enforce password or personal identification number (PIN) requirements, or any other security or acceptable-use policies that are defined in the management service 116 and sent to the management component 145 over the network 119.

To carry out local management of a client device 106, the management component 145 can be installed and executed with elevated or administrative privileges on the client device 106. In some scenarios, the operating system can allow a particular application or package to be identified as a device owner or a device administrator.

One or more applications 147 can be installed on the client device 106. As a managed device that is enrolled with the management service 116, some applications 147 can be installed by the management service 116. In one scenario, the management service 116 can send a request to the management component 145 to retrieve and install a particular application 147 on the client device 106. In this sense, installation of the application is initiated by the management service 116. The management service 116 can also provide configuration data for a particular application 147 that it installed on the client device 106. For example, the management service 116 can transmit policies or profiles that instruct the client device 106 to route some or all network traffic from the application 147 through the tunnel client 149. The tunnel client 149 can secure the traffic by applying a security layer, such as an encryption layer, to the traffic. In other words, the tunnel client 149 can wrap the traffic with an encryption layer.

The client device 106 can also execute a tunnel client 149 that provides for network tunneling or VPN capabilities. The operating system of the client device 106, in some examples, can also allow VPN capabilities to be bound to one or more applications 147. In other words, the tunnel client 149 can provide per-app VPN capabilities where some or all network traffic originating from an application 147 is routed through the tunnel client 149. In some example, traffic routed through the tunnel client 149 can be secured using a device certificate 124 generated or obtained by the management service 116, which can be installed on the client device 106 by the management component 145 upon receiving the device certificate 124 from the management service 116.

As noted above, a separate VPN configuration 151 can be used for each application 147 installed on the client device 106. For example, an enterprise may prefer that network traffic sent and received from particular application 147 be routed through the tunnel client 149 according to a particular VPN configuration 151. The VPN configuration 151 can also specify what device identifying information is embedded into packets that are routed through the tunnel client 149. For example, the VPN configuration 151 can specify that TLS should be employed to secure traffic from a particular application 147 and that device identifying parameters, such as a network address of the client device 106, a geolocation of the client device 106, a timestamp, an identity of the application 147, a device identifier of the client device 106, an operating system version, user-identifying information such as a user identifier, or other device identifying parameters that can be extracted from the operating system or the management component 145.

The VPN configuration 151 can include a list of settings for a VPN connection to be used by the tunnel client 149 to connect to a corresponding VPN. For example, the VPN configuration 151 can include a username, a password, a digital certificate, an address of a VPN server, such as the tunnel gateway 120, a communications protocol (e.g. PPP, IPsec, a secure sockets layer (SSL) or transport layer security (TLS) based VPN protocol, or some other VPN protocol) for the VPN connection. In some instances, the VPN configuration 151 can also specify values for various settings of the tunnel client 149. For example, the VPN configuration 151 can specify which Domain Name System (DNS) servers to use with the tunnel client 149, which IP address or addresses to assign to or associate with the tunnel client 149, the subnet mask of the tunnel client 149, the media access control (MAC) address to assign to or associate with the tunnel client 149, and potentially other settings for the tunnel client 149. These various settings can be considered device identification parameters 134 that are embedded within the security layer, and the management service 116 can identify the client device 106 using these device identification parameters 134 because the management service 116 can be the process that provisions the client device 106 with the VPN configuration 151.

The VPN configuration 151 can be obtained by the management component 145 from the management service 116 and installed as a profile on the client device 106. In one example, the management service 116 can initiate installation of a particular application 147 and generate a VPN configuration 151 that can be transmitted to and installed by the management component 145 on the client device 106. The VPN configuration 151 can be specifically generated by the installation of the application 147. The VPN configuration 151 can cause the operating system of client device 106 to route some or all network traffic originating from the application 147 through a VPN connection that is established by the tunnel client 149.

The VPN configuration 151 can specify that a security layer be applied to network traffic from the application 147, such as authentication requests sent to the application service 107 or to the identity provider 118. The security layer can include an encryption layer, such as a TLS encryption layer, that is applied to network traffic sent to a particular destination. The TLS encryption layer, for example, can be terminated at the authentication proxy 122.

The application service 107 represents one or more servers associated with a service that the application 147 might access over the network 119. For example, a particular application 147 deployed onto the client device 106 might require access to an internet or cloud-based service. In some examples, the application service 107 can require user authentication. In some instances, the application service 107 can support federated authentication protocols in which authentication of a user's identity is performed by the identity provider 118. Examples of the disclosure can facilitate single sign-on of a user, where the user can authenticate his or her credentials to the identity provider 118 and access the application service 107 through the application 147 in scenarios where the application service 107 supports federated authentication and also supports user authentication using the identity provider 118.

In one example, the application 147 can request content from the application service 107. In some scenarios, the request for content can be tunneled through the tunnel client 149 with a security layer applied to the request. In other scenarios, the VPN configuration 151 can specify that only traffic routed to the identify provider 118 or authentication proxy 122 should be routed through the tunnel client 149. In response, the application service 107 can determine whether the application 147 has been authenticated. For example, the application service 107 can determine whether the application 147 provides a valid and unexpired authentication token to the application service 107.

If the application 147 is not authenticated or requires re-authentication, the application service 107 can redirect the application 147 to identity provider 118 with instructions to obtain an authentication credential or token, such as an authentication assertion, from the identity provider 118 and present the credential to the authentication service 107. In one scenario, the application service 107 can issue a redirect message to the application 147 with instructions to redirect to the identity provider 118.

Upon receiving the redirect instructions, the application 147 can generate an authentication request for transmission to the identity provider 118. As noted above, the VPN configuration 151 installed by the management component 145 can specify that traffic sent to the identity provider 118 be sent through a VPN connection such that the security layer is layered onto the authentication request. In some scenarios, the application 147 can secure the authentication request with a TLS encryption layer, and the tunnel client 149 can wrap the authentication request with an additional TLS encryption layer in which device identification parameters 134 are embedded. The security layer, or the additional TLS encryption layer, can be terminated at the authentication proxy 122. If the application 147 applies an initial encryption layer to the authentication request, this initial encryption layer can be terminated at the identity provider 118.

Additionally, although described as a part of enterprise computing environment 103, the management service 116, identity provider 118, and tunnel gateway 120 can be third-party services relative to each other, on-premises services, cloud-based services, or services provided by a single entity.

Figure 2:
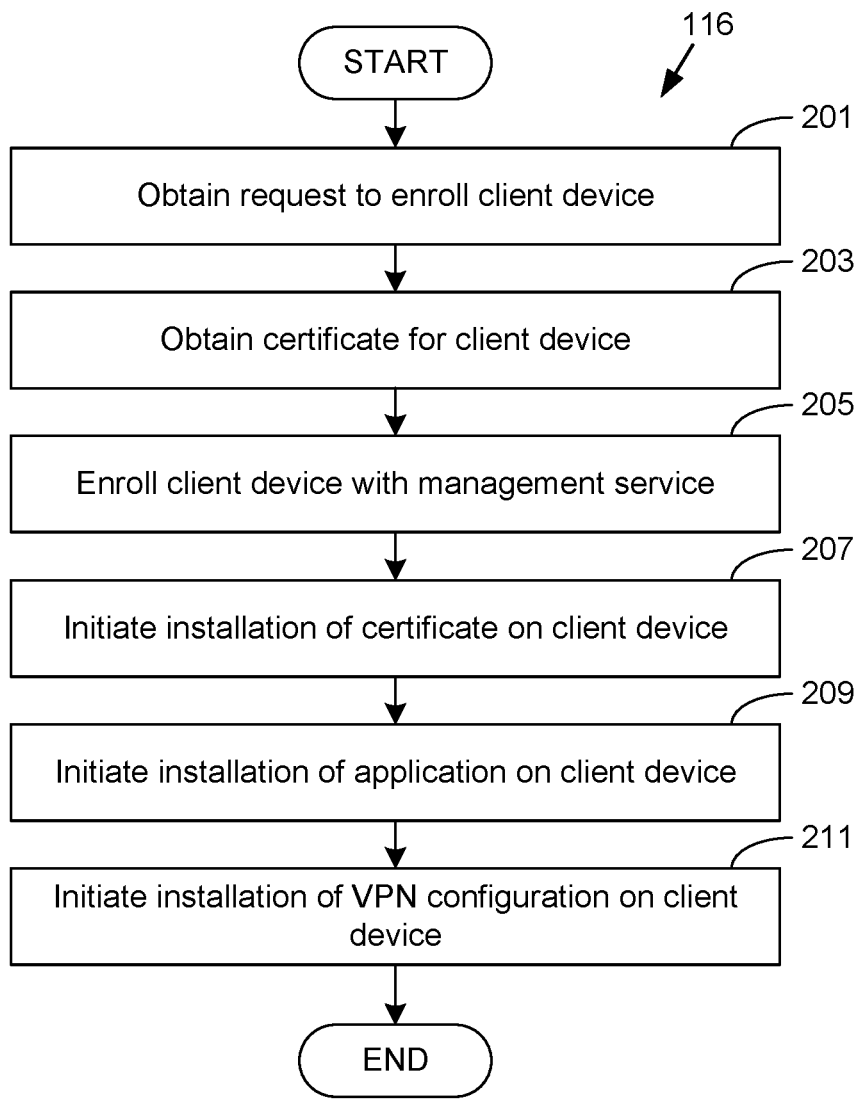
FIG. 2 is a flowchart that illustrates functionality according to a first example of the disclosure.

Referring next to FIG. 2, shown is a flowchart that provides one example of how the management service 116 can deploy an application to a managed device and install a VPN configuration 151 that is associated with the application so that authentication requests are routed through the tunnel client 149 to the authentication proxy 122. First, at step 201, the management service 116 can obtain a request to enroll a client device 106 as a managed device. The request to enroll the client device 106 can be obtained from the management component 145 or another process installed on the client device 106. The request can include the user credentials of a user within the enterprise environment.

At step 203, the management service 116 can obtain or generate a device certificate 124 that is associated with the client device 106. The device certificate 124 can be uniquely associated with the client device 106 or uniquely associated with a particular application 147 installed on the client device 106. At step 205, the management service 116 can enroll the client device 106 with the management service 116. In one example, enrollment can be completed by creating a device record associated with the client device 106 and installation of the management component 145 on the client device 106.

At step 207, the management service 116 can initiate installation of the device certificate 124 on the client device 106. In one example, the management service 116 can provide the device certificate 124 to the management component 145, which can save or install the device certificate 124 in an area on the client device 106 that is accessible only to the applications 147 that are deployed by the management service 116 or by certain applications and services. The applications and services can be identified by the management service 116 or by the operating system. In one example, access to the device certificate 124 can be limited to the tunnel client 149.

At step 209, the management service 116 can initiate installation of an application 147 on the client device 106. In one example, the management service 116 can transmit a command to the management component 145 to download and install the application 147 from a public application repository. The application 147 can be installed and managed by the management component 145. At step 211, the management service can then initiate installation of a VPN configuration 151 on the client device 106. The VPN configuration 151 can be linked with the application 147 such that some or all network traffic originating from the application 147 is routed through a tunnel client 149 that tunnels traffic over a VPN connection. In this sense, the tunnel client 149 can apply a security layer to the traffic according to the VPN configuration 151. The VPN configuration 151 can specify the device certificate 124 that should be used to secure or encrypt the traffic as well as the VPN protocols that should be employed.

In some examples, the VPN configuration 151 can specify that all network traffic should be sent to the tunnel gateway 120 over a VPN connection. The tunnel gateway 120 can then route authentication requests to the identity provider 118. In other scenarios, the VPN configuration 151 and tunnel client 149 can employ split routing whereby only certain traffic that is identified by domain name, network address, or other identification mechanisms, is routed through the tunnel client 149 and over a VPN connection to its destination.

The VPN configuration 151 generated by the management service 116 can also terminate its connection at the authentication proxy 122 so that the authentication proxy 122 can remove the security layer and extract device identification parameters from an authentication request. The authentication proxy 122 can also store a certificate signature 132 with which the security layer was generated.

In some examples, an administrator of the management service 116 or identity provider 118 can specify a configuration option that determines whether a device posture assessment should be performed when analyzing an authentication request. In some examples, the VPN configuration 151 can be installed based upon whether an administrator has enabled a requirement to perform a device posture assessment in addition to authenticating a user's credentials. In other examples, the management service 116 can transmit a compliance rule that can be enforced by the management component 145 that identifies applications 147 for which a device posture assessment is required in addition to authentication of the user's credentials. For the applications 147 that are identified, the management component 145 can install a VPN configuration 151 that applies a security layer including device identification parameters 134 to authentication requests sent from the applications 147.

For applications 147 that are not identified, the management component 145 can avoid installing a VPN configuration 151 for those applications 147. In other words, an administrator of the management component 116 or identity provider 118 can specify whether an assessment of the device is needed to authenticate an authentication request, and the management component 145 can enforce the requirement on the applications 147 that are identified by the administrator that communicated from the management service 116 to the management component 145.

In some examples, the management service 116 or identity provider 118 can also configure the authentication proxy 122 by identifying which device identification parameters 134 should be extracted from an authentication request and which should be retained. The authentication proxy 122 can also be configured to specify a particular format or type of security layer that should be applied to authentication requests. In this way, unexpected communications or communications that are improperly wrapped with a security layer can be discarded or designated as potentially malicious.

In some examples, the requirement to include a device posture assessment as part of authenticating an authentication request from an application 147 can be set by the management service 116 for certain users or user groups and for certain applications 147 or types of applications 147 that are installed on client devices 106 enrolled with the management service 116 as managed devices.

Figure 3:
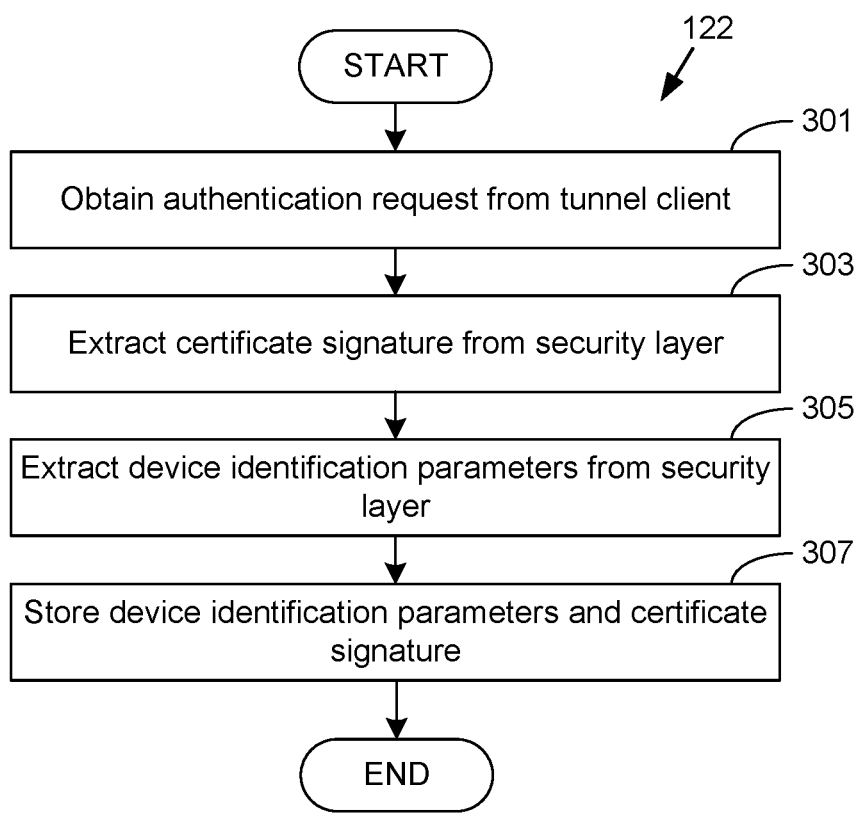
FIG. 3 is a flowchart that illustrates functionality according to a second example of the disclosure.

Referring next to FIG. 3, shown is a flowchart that provides one example of how the authentication proxy 122 can obtain an authentication request and store device identification parameters in the data store 113. First, at step 301, the authentication proxy 122 can obtain an authentication request originating from an application 147 on the client device 106 from the tunnel client 149. In some examples, the authentication request can be received from the tunnel gateway 120 if the tunnel client 149 routes all traffic through the tunnel gateway 120 rather than directly to its destination or termination point.

At step 303, the authentication proxy 122 can extract or generate a certificate signature from the security layer applied to the authentication request by the tunnel client 149. In other words, the authentication proxy 122 can store data from which the device certificate 124 used to encrypt or secure the authentication request by the tunnel client 149 can be identified. At step 305, the authentication proxy 122 can extract device identification parameters embedded within the security layer applied to the authentication request by the tunnel client 149. At step 307, the authentication proxy 122 can store the device identification parameters 134 and the certificate signature 132 in the data store 113.

Figure 4:
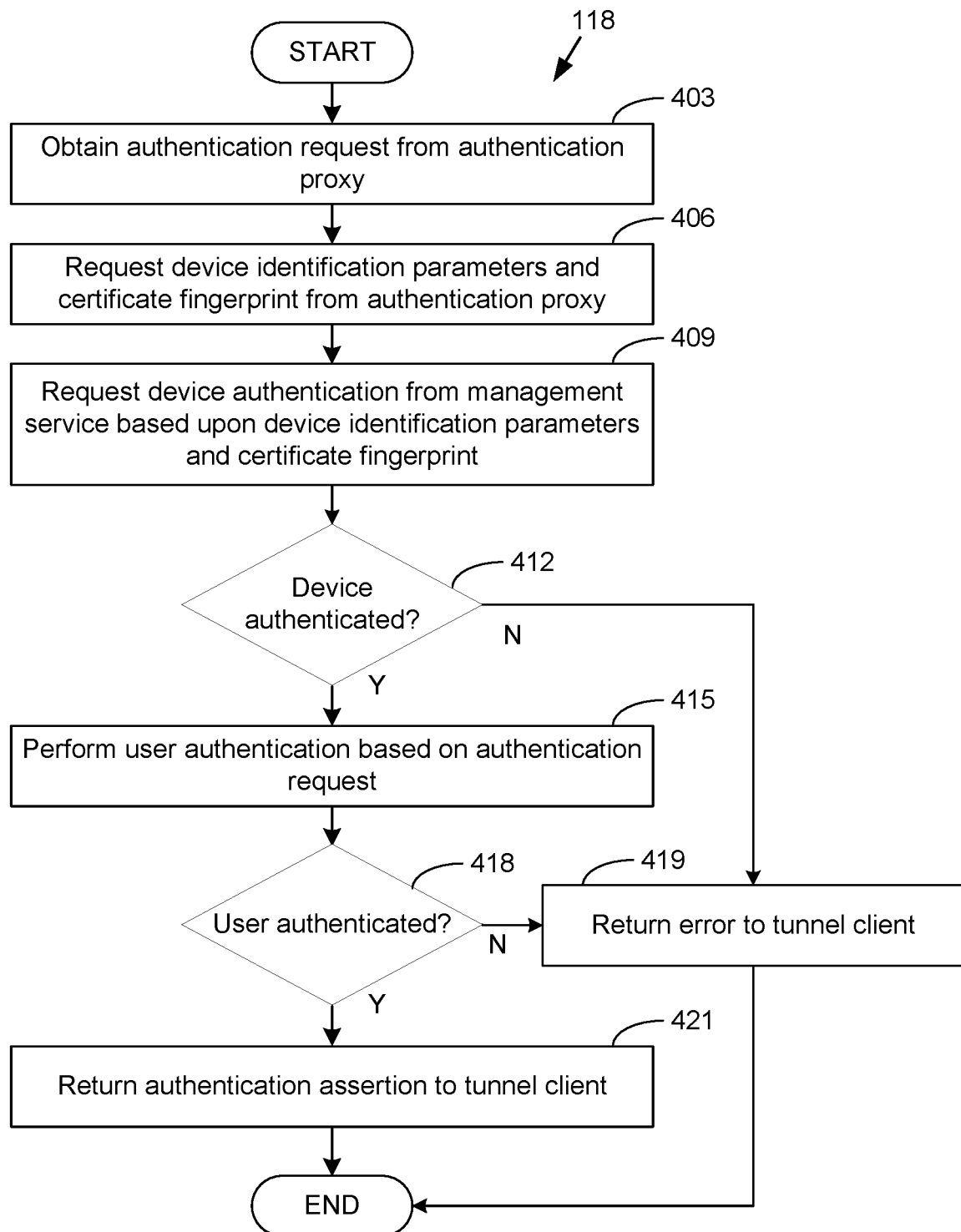
FIG. 4 is a flowchart that illustrates functionality according to a third example of the disclosure.

Referring next to FIG. 4, shown is a flowchart that provides one example of how the identity provider 118 can authenticate a user on behalf of an application 147 or application service 107. FIG. 4 also illustrates how the identity provider 118 can perform a device posture assessment or a device compliance check as a part of the authentication process. First, at step 403, the identity provider 118 can obtain an authentication request from the authentication proxy 122. The authentication request can include a user identifier, an authentication token, or any other credential that can be verified or authenticated by the identity provider 118. At step 406, the identity provider 118 can request the device identification parameters 134 and certificate signature 132 corresponding to the authentication request from the authentication proxy 122. In one example, the identity provider 118 can extract a network address or other identifier embedded within the authentication request with which the authentication proxy 122 can identify the requested device identification parameters 134 and certificate signature 132. In some cases, the authentication proxy 122 may not have any device identification parameters 134 or certificate signature 132 corresponding to the request received from the identity provider 118. In this scenario, the authentication proxy 122 can return an error to the identity provider 118.

At step 409, the identity provider 118 can request authentication of the client device 106 based upon the device identification parameters 134 and certificate signature 132. Authentication of the client device 106 can include a compliance check by the management service 116. The identity provider 118 can provide the device identification parameters 134 and/or certificate signature 132 to the management service 116. The management service 116 looks up the compliance status 125 of the device in the data store 113, which has been previously stored and continuously updated by the management component 145 and the management service 116. In other words, the management service 116 can determine whether the compliance status 125 corresponding to the client device 106 indicates that the client device 106 is in compliance with the compliance rules associated with the enterprise.

At step 412, the identity provider 118 can determine, based upon a response from the management service 116, whether the client device 106 is in compliance with one or more of the compliance rules of the enterprise. If the client device 106 is not in compliance with one or more of the compliance rules of the enterprise according to the compliance status 125, the identity provider 118 can proceed to step 419 and return an authentication error. The authentication error can be sent to the application service 107 or the application 147 through the tunnel client 149 by way of the authentication proxy 122.

In some examples, at step 419, the identity provider 118 can provide information within the authentication error about which compliance rules have been violated so that a user can take action to bring the device into compliance.

If the client device 106 is in compliance with the compliance rules of the enterprise, the process can proceed from step 412 to step 415, where the identity provider 118 can authenticate the user credentials of the user that are within the authentication request.

At step 418, the identity provider 118 determines whether the user can be authenticated based upon the authentication request. If the user credentials of the user cannot be authenticated, the process proceeds to step 419, where an authentication error is returned to the application 147 or application service 107. In some scenarios, the identity provider 118 can determine that an authentication token has expired and request that the user re-authenticate or renew the authentication token, at which point the authentication request can be authenticated.

If the authentication request can be authenticated at step 418, the process proceeds to step 421, where the identity provider 118 can return an authentication assertion to the tunnel client 149, which can forward the authentication assertion to the application 147. The authentication assertion can be provided by the application 147 to the application service 107 to authenticate the user's access to the application service 107. In this way, the user can be authenticated based upon his or her enterprise credentials that may have been previously authenticated on the client device 106 by the identity provider 118 together with a check of the device compliance posture. Accordingly, the user can be authenticated by the identity provider 118 without requiring the user's credentials a second time.

Figure 5:
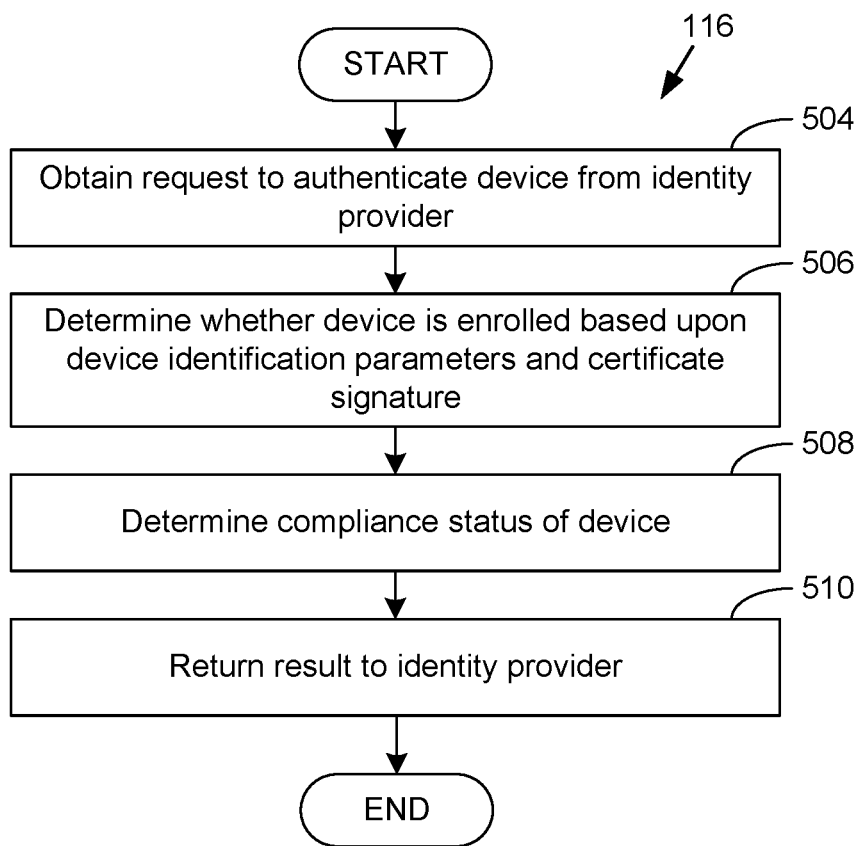
FIG. 5 is a flowchart that illustrates functionality according to a fourth example of the disclosure.

Referring next to FIG. 5, shown is a flowchart that provides one example of how the management service 116 can perform a device posture assessment by determining whether the device is in compliance with compliance rules of the enterprise. First, at step 504, the management service 116 can obtain a request to authenticate a device from the identity provider 118. The request to authenticate the client device 106 can include one or more of the device identification parameters 134 or the certificate signature 132 extracted from the security layer by the authentication proxy 122. The management service 116 can identity the client device 106 corresponding to the device identification parameters 134 or device certificate 132 and determine whether the device is a managed device that is enrolled with the management service 116 at step 506.

At step 508, the management service 116 can determine the compliance status 125 of the client device. The compliance status 125 can indicate whether and to what extent the management service 116 is in compliance with the compliance rules of the enterprise. In one example, a determination of whether the client device 106 is in compliance with compliance rules can be made by ensuring that an application identifier embedded within the device identification parameters 134 corresponds to a managed application that was deployed by the management service 116 to the client device 106 from which the authentication request was received. The client device 106 can be identified based upon a device identifier or certificate signature 132 embedded within the device identification parameters 134. The device identifier and application identifier can be stored by the management service 116 in the data store 112 when the device is enrolled and when the application 147 is deployed to the client device 106, respectively.

At step 510, the management service 116 can return a result of the compliance check or device posture assessment to the identity provider 118, which can base a determination of whether to authenticate the authentication request based upon the compliance status 125 of the client device 106. In this way, the identity provider 118 can take into account the user's credentials as well as the status of the client device 106 from which the authentication request originates when determining whether to authenticate an authentication request.

The flowcharts of FIGS. 2-5 show an example of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 2-5 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 116, identity provider 118, authentication proxy 122, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

We claim the following:

1. A system for authenticating a user and determining a device posture during authentication, comprising:
    at least one computing device comprising a processor and a memory; and
    an identity provider executable by the at least one computing device, the identity provider causing the at least one computing device to at least:
        obtain an authentication request over a network connection from an authentication proxy, the authentication request being received from a tunnel client executed by a client device, and the tunnel client terminating a virtual private network (VPN) connection at the authentication proxy;
        query the authentication proxy for at least one device identification parameter associated with the authentication request, wherein the at least one device identification parameter is embedded within a security layer applied to the authentication request;
        provide the at least one device identification parameter to a management service;
        obtain an indication from the management service of whether the client device corresponding to the at least one device identification parameter is compliant with a plurality of compliance rules; and
        authenticate the client device in response to receiving an indication that the client device is compliant with the plurality of compliance rules.

2. The system of claim 1, wherein the at least one device identification parameter comprises at least one of: an application identifier associated with an application, a timestamp, a device identifier associated with the client device, an operating system version of the client device, a geolocation parameter, or a network address of the client device.

3. The system of claim 1, wherein the authentication request is secured with transport layer security (TLS), and wherein the security layer comprises an additional TLS layer applied to the authentication request.

4. The system of claim 1, wherein the indication of whether the client device is compliant with a plurality of compliance rules is further based upon at least one of: whether the client device is enrolled with the management service as a managed device, or whether a particular installation of an application is a managed application.

5. The system of claim 1, wherein the authentication request is received from a tunnel client executed on the client device, and wherein the tunnel client is: configured using a virtual private network (VPN) configuration installed on the client device, and associated with a particular application installed on the client device.

6. The system of claim 1, wherein the indication of whether the authentication request has been authenticated comprises an authentication assertion encoded in Security Assertion Markup Language (SAML).

7. The system of claim 1, wherein the indication of whether the authentication request has been authenticated is generated by the client device without requiring an additional credential to be entered by the user.

8. A method for authenticating a user and determining a device posture during authentication, comprising:
    obtaining an authentication request over a network connection from an authentication proxy, the authentication request being received from a tunnel client executed by a client device, and the tunnel client terminating a virtual private network (VPN) connection at the authentication proxy;

querying the authentication proxy for at least one device identification parameter associated with the authentication request, wherein the at least one device identification parameter is embedded within a security layer applied to the authentication request;

providing the at least one device identification parameter to a management service;

obtaining an indication from the management service of whether the client device corresponding to the at least one device identification parameter is compliant with a plurality of compliance rules; and authenticating the client device in response to receiving an indication that the client device is compliant with the plurality of compliance rules.

9. The method of claim 8, wherein the at least one device identification parameter comprises at least one of: an application identifier associated with an application, a timestamp, a device identifier associated with the client device, an operating system version of the client device, a geolocation parameter, or a network address of the client device.

10. The method of claim 8, wherein the authentication request is secured with transport layer security (TLS), and wherein the security layer comprises an additional TLS layer applied to the authentication request.

11. The method of claim 8, wherein the indication of whether the client device is compliant with a plurality of compliance rules is further based upon at least one of: whether the client device is enrolled with the management service as a managed device, or whether a particular installation of an application is a managed application.

12. The method of claim 8, wherein the authentication request is received from a tunnel client executed on the client device, and wherein the tunnel client is: configured using a virtual private network (VPN) configuration installed on the client device, and associated with a particular application installed on the client device.

13. The method of claim 8, wherein the indication of whether the authentication request has been authenticated comprises an authentication assertion encoded in Security Assertion Markup Language (SAML).

14. The method of claim 8, wherein the indication of whether the authentication request has been authenticated is generated by the client device without requiring an additional credential to be entered by the user.

15. A non-transitory computer-readable medium comprising executable instructions for authenticating a user and determining a device posture during authentication, the instructions, when executed, causing at least one computing device to at least:

obtain an authentication request over a network connection from an authentication proxy, the authentication request being received from a tunnel client executed by a client device, and the tunnel client terminating a virtual private network (VPN) connection at the authentication proxy;

query the authentication proxy for at least one device identification parameter associated with the authentication request, wherein the at least one device identification parameter is embedded within a security layer applied to the authentication request;

provide the at least one device identification parameter to a management service;

obtain an indication from the management service of whether the client device corresponding to the at least one device identification parameter is compliant with a plurality of compliance rules; and authenticate the client device in response to receiving an indication that the client device is compliant with the plurality of compliance rules.

16. The non-transitory computer readable medium of claim 15, wherein the at least one device identification parameter comprises at least one of: an application identifier associated with an application, a timestamp, a device identifier associated with the client device, an operating system version of the client device, geolocation parameters, or a network address of the client device.

17. The non-transitory computer readable medium of claim 15, wherein the authentication request is secured with transport layer security (TLS), and wherein the security layer comprises an additional TLS layer applied to the authentication request.

18. The non-transitory computer readable medium of claim 15, wherein the indication of whether the client device is compliant with a plurality of compliance rules is further based upon at least one of: whether the client device is enrolled with the management service as a managed device, or whether a particular installation of an application is a managed application.

19. The non-transitory computer readable medium of claim 15, wherein the authentication request is received from a tunnel client executed on the client device, and wherein the tunnel client is: configured using a virtual private network (VPN) configuration installed on the client device, and associated with a particular application installed on the client device.

20. The non-transitory computer readable medium of claim 15, wherein the indication of whether the authentication request has been authenticated comprises an authentication assertion encoded in Security Assertion Markup Language (SAML).

* * * * *